Jan. 13, 1931.  E. R. MORTON  1,788,733
REGULATOR SYSTEM
Filed April 24, 1929
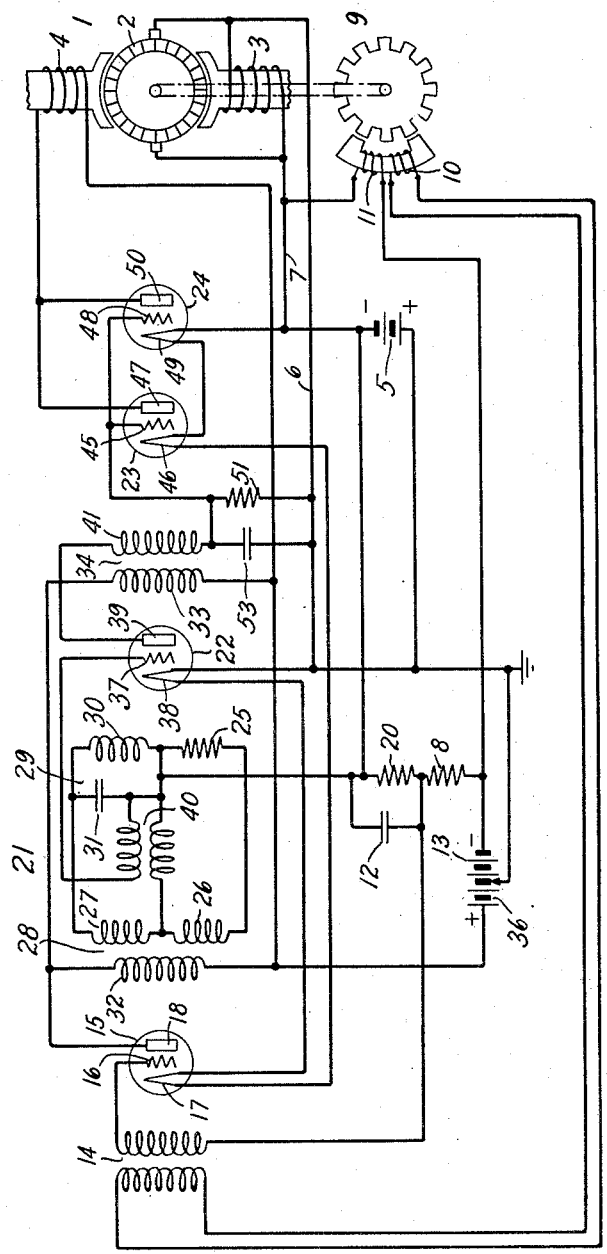
INVENTOR
E. R. MORTON
BY Wayne B Wells
ATTORNEY Patented Jan. 13, 1931

1,788,733

UNITED STATES PATENT OFFICE

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR SYSTEM

Application filed April 24, 1929. Serial No. 357,668.

This invention relates to regulator systems for controlling a characteristic of a dynamo-electric machine and particularly to anti-hunting means for motor speed regulator systems.

One object of the invention is to provide a precision regulator system for controlling a characteristic of a dynamo-electric machine that shall be provided with improved means for stabilizing the regulating operation to prevent hunting action.

Another object of the invention is to provide a motor speed regulator system having a detector tube controlled by a Wheatstone bridge circuit for controlling the motor excitation to govern the motor speed that shall be provided with improved means in the detector output circuit for so controlling the Wheatstone bridge circuit as to stabilize the regulating operation.

A further object of the invention is to provide a motor speed regulator system having thermionic vacuum tubes controlled according to the motor speed for governing the excitation of the motor to maintain the speed thereof constant that shall so control the potentials impressed on the grids of the thermionic tubes as to compensate for changes in voltage of the current supplied to the motor.

In many cases it is desirable to operate a motor at constant speed with close precision. As an example of a motor which must be operated at constant speed may be cited the motor for operating the carrier-current generator in a voice-frequency carrier-current system. The speed of the motor in the above mentioned system must be held at a constant speed with precision in order to maintain the frequency of the generated current constant.

The system used to disclose the invention employs thermionic vacuum tube circuits for controlling the field excitation of a motor to maintain the speed thereof constant. The regulator system employs no moving parts and is very sensitive and quick acting. A sensitive regulator of the vacuum tube type will hunt unless special means is provided to stabilize the regulating operation. In the disclosed system the inherent precision of the regulator is momentarily reduced, upon tendency of the motor to change speed, for a sufficient time to prevent hunting action.

In the system used to disclose the invention, a pilot generator is directly connected to the motor for developing a frequency which varies according to the motor speed. The pilot generator supplies current to a Wheatstone bridge circuit having one arm thereof in the form of a tuned circuit. The resonant arm of the bridge circuit is tuned to the frequency developed by the generator when the motor is operated at normal speed. A thermionic amplifier tube of limited power output is provided between the generator and the Wheatstone bridge circuit. The amplifier tube serves to limit the power which may be supplied by the generator to the Wheatstone bridge circuit. A phase detector tube has an alternating potential impressed on the grid thereof from the bridge circuit and an alternating potential impressed upon the plate thereof from the amplifier connected to the pilot generator. The phase relation of the potentials impressed on the grid of the phase detector tube varies with respect to the potentials impressed on the plate of such tube according to the frequency of the current produced by the pilot generator. A resistance element is provided for coupling the phase detector tube to regulating tubes which control the field excitation of the motor. The field excitation is so controlled as to maintain the motor speed substantially constant.

A regulating system of the above type will operate with very close precision, but will hunt unless special means is provided for stabilizing the regulating operation. A condenser is connected across the coupling resistance between the phase detector tube and the regulator amplifier tubes for so controlling the Wheatstone bridge circuit as to stabilize the regulating operation and prevent hunting action. The power required for charging the condenser changes the voltage supplied to the Wheatstone bridge. This lowers the precision of the bridge circuit to lower the sensitiveness of the regulator system.

The voltage supplied to the bridge is changed by reason of the amplifier tube having a limited power output. The delay in the precision operation of the system is only momentary and so serves to stabilize the regulating operation as to prevent hunting action.

Compensation is provided in the system for any change in voltage of the source connected to the motor. The grids of the phase detector tube and the two regulator amplifier tubes are so connected to the source of current for operating the motor as to compensate for any change in the voltage of such source. In this manner correction is made for any change in the voltage in the supply source without necessitating change in speed of the motor to operate to the regulator system.

The single figure in the accompanying drawing is a diagrammatic view of a regulator system constructed in accordance with the invention.

Referring to the accompanying drawing, a direct current motor 1 comprising an armature 2, a shunt field winding 3 and a regulator field winding 4 is operated by a batttery or source of power 5. The armature 2 and the field winding 3 are directly connected across supply conductors 6 and 7.

An alternating-current generator 9 of the inductor type is directly connected to the motor 1. The generator 9 comprises an armature winding 10 and a field winding 11. The fielding winding 11 is connected to a suitable source of power as for example battery 13. The armature circuit of the generator is connected by a transformer 14, to the input circuit of a thermionic amplifier tube 15. The amplifier tube 15 has a limited power output and comprises a grid 16, a filament 17, and a plate 18. Heating current for the filament 17 is obtained from the source 5 and grid bias for the amplifier tube 15 is obtained across the resistance elements 8 and 20. A condenser 12 is connected to the resistance elements to provide a low impedance path for alternating potentials. The amplifier tube 15 is connected to a Wheatstone bridge circuit 21 which controls a phase detector tube 22 and two regulator amplifier tubes 23 and 24, for governing the excitation of the regulator field winding 4 to maintain the motor speed constant.

The Wheatstone bridge circuit 21 comprises a resistance arm 25, two arms 26 and 27 which form the secondary winding of a transformer 28 and a resonant arm 29. The resonant arm 29 comprises an inductance element 30 and a condenser 31, which are tuned to the frequency of the generator 9 when the motor 1 is operated at normal speed.

The primary winding 32 of the transformer 28 is connected to the output circuit of the amplifier tube 15 in parallel with the primary winding 33 of a transformer 34. The transformer 34 supplies alternating potential to the plate of the phase detector tube 22 for a purpose to be hereinafter set forth. Plate potential for the amplifier tube 15 is supplied by a source 36.

The phase detector tube 22, which comprises a grid 37, a filament 38 and a plate 39, has the input circuit thereof connected to two opposite vertices of the Wheatstone bridge circuit 21 by means of an output transformer 40. The grid 37 of the phase detector tube has a potential impressed thereon from the bridge circuit which varies according to the frequency developed by the pilot generator 9. The transformer 34 is provided with a secondary winding 41 which is connected to the plate 39 of the phase detector tube.

The plate 39 of the phase detector tube has alternating potential impressed thereon directly from the amplifier tube 15 and the grid of the phase detector tube has alternating potential impressed thereon from the Wheatstone bridge circuit 21. The potential impressed upon the grid of the phase detector tube from the Wheatstone bridge circuit varies in phase with respect to the potential impressed upon the plate of the phase detector tube according to the frequency of the current produced by the pilot generator 9. The frequency of the current produced by the generator 9 varies according to the speed of the motor 1. Accordingly the output from the phase detector tube 22 varies according to the speed of the motor 1. In the patents to H. M. Stoller No. 1,695,035, dated December 11, 1928, and No. 1,711,661 dated May 7, 1929, are disclosed bridge circuit arrangements very similar to the regulator system above described. Accordingly a detailed description of the function and operation of the Wheatstone bridge circuit in combination with the phase detector tube is deemed unnecessary.

The two regulator amplifier tubes 23 and 24 are connected in parallel circuit relation between the phase detector tube 22 and the motor regulator field winding 4. The tube 23 comprises a grid 45, a filament 46 and a plate 47. The regulator tube 24 comprises a grid 48, a filament 49 and a plate 50. The input circuits of the two regulator tubes 23 and 24 are coupled to the phase detector tube 22 by means of a coupling resistance 51. A positive potential with respect to the potentials on the filaments 46 and 49 is impressed on the grids 45 and 48 of the regulator tubes from the source 5. Plate potential for the regulator tubes 23 and 24 is provided by the source 36.

In order to stabilize the regulating operation and prevent hunting action, a condenser 53 is connected across the coupling resistance 51. The condenser 53 may be said to effect delayed precision in the operation of the regulator system or to reduce the corrective force in magnitude for a time. The bridge circuit and phase detector plate are supplied from the same source, namely, the amplifier tube 15 which has a very limited power output. Accordingly, when the phase detector tube 22 draws current to charge the condenser 53 across the coupling resistance 51, the voltage condition on the bridge circuit is momentarily changed to delay the corrective force of the regulator circuit for a sufficient time to prevent the regulator from hunting.

If the motor 1 tends to increase in speed, the generator 9 is operated to raise the frequency of the generated current. The Wheatstone bridge circuit 21 varies the phase relation of the potential impressed upon the grid 37 of the phase detector 22 with respect to the potential impressed upon the plate 39 of such tube to lower the output from the phase detector tube. The potential drop across the coupling resistance 51 is lowered to increase the output from the regulator amplifier tubes 23 and 24. The increased output from the regulator tube increases the current flow through the regulating field winding 4 to oppose the tendency of the motor to increase in speed. When the output from the phase detector tube 22 changes, the condenser 53 is charged to load the amplifier 15 and momentarily reduce the inherent precision of the bridge circuit 21 for a sufficient length of time to prevent the regulating operation from over-shooting or hunting.

If the speed of the motor 1 tends to decrease, the pilot generator 9 is operated to develop current having a lower frequency. The lower frequency current of the pilot generator 9 operates the Wheatstone bridge circuit 21 to change the phase relation between the potentials impressed upon the grid and plate of the phase detector tube 22 and increase the output from the phase detector tube. The increased output from the phase detector tube increases the drop across the coupling resistance 51 to increase the negative potential impressed on the grids of the regulator tubes 23 and 24 and lower the output of the regulator tubes. The reduced output from the regulator tubes lowers the excitation of the regulating field winding 4 to oppose the tendency of the motor to lower speed operation. The charging of the condenser 53 by the change in the output of the phase detector tube 22 momentarily overloads the amplifier tube 15 to reduce the inherent precision of the regulator system for a length of time sufficient to prevent hunting action.

Grid biasing potential for the phase detector tube 22 and the regulator tubes 23 and 24 is obtained from the source 5 to compensate for the changes in voltage supplied to the motor 1. The grid 37 of the phase detector tube 22 receives a negative bias with respect to the potential on the filament 38 from the source 5 whereas the grids 45 and 48 of the regulator tube receive a positive bias with respect to the potentials on the filaments 46 and 49 from the source 5. The change in the voltage of the source 5 tends to change the regulator field winding 11 by changing the initial positive bias on the grids of the regulator tubes 23 and 24 and the negative bias of the grid of the phase detector tube. The changes in the grid bias, on the phase detector tube 22 and the regulator tubes 23 and 24 tends to so change the regulating field of the motor as to compensate for the changes in the voltage of the power supplied to the motor.

Modification in the system and the arrangement and location of parts may be made within the spirit and scope of the invention and such modifications are intended to be covered by the appended claims.

What is claimed is:

1. In a regulator system, a dynamo-electric machine, means comprising a detector tube for controlling a characteristic of said machine, means comprising a Wheatstone bridge circuit for operating said detector tube to maintain the machine characteristic constant, and means in the detector output circuit for so controlling the bridge circuit as to stabilize the regulating operation and prevent hunting action.

2. In a speed regulator system, a motor having a regulating field winding, means comprising a space discharge device for controlling said field winding to govern the motor speed, means comprising a Wheatstone bridge circuit for controlling said device to maintain the motor speed constant, and means in the output circuit of said device for so controlling the bridge circuit as to stabilize the regulating operation and prevent hunting action.

3. In a speed regulator system, a motor having a regulating field winding, a space discharge device, means comprising a Wheatstone bridge circuit for operating said device according to the motor speed, a regulating tube operated by said device for controlling said field winding to maintain the motor speed constant, a resistance element for coupling the device to said regulating tube, and means comprising a condenser connected in shunt to said coupling resistance for so controlling the bridge circuit as to stabilize the regulating operation and prevent hunting action.

4. In a regulator system, a dynamo-electric machine, a space discharge device, means comprising a Wheatstone bridge circuit for operating said device according to a characteristic of said machine, means comprising a regualting tube operated by said device for controlling said machine to maintain the characteristic thereof constant, a resistance element for coupling the device to said regulating tube and means comprising a condenser connected in shunt to said coupling resistance for so controlling the bridge circuit as to stabilize the regulating operation and prevent hunting action.

5. In a motor speed regulator system, a source of alternating current of limited power output having a frequency varying according to the motor speed, means comprising a phase detector tube for controlling the excitation of the motor to govern the speed thereof, means comprising a Wheatstone bridge circuit connected to said source for operating the detector tube to maintain the motor speed constant, and means in the detector output circuit for so controlling the bridge circuit as to stabilize the regulating operation and prevent hunting action.

6. In a regulator system, a motor having a regulating field winding, a source of alternating current having a frequency proportional to the motor speed and a power output of the same order of magnitude as its normal load, frequency sensitive means connected to and comprising the load on said source of current, a detector tube controlled by said means, and means comprising a regulator tube operated by said detector tube for controlling the excitation of said field winding to maintain the motor speed constant.

7. In a regulator system, a dynamo-electric machine, a source of alternating current having a frequency varying according to a characteristic of said machine, means comprising a phase detector tube for controlling said machine to govern the characteristic thereof, means comprising a Wheatstone bridge circuit connected to said source of alternating current for operating the phase detector tube according to the frequency of said current to maintain the machine characteristic constant, and means in the detector output circuit for so controlling the bridge circuit as to stabilize the regulating operation and prevent hunting action.

8. In a motor speed regulator system, a source of alternating current of limited power output having a frequency varying according to the motor speed, a phase detector tube, means comprising a Wheatstone bridge circuit connected to said source for operating the phase detector tube according to the frequency of said source, means comprising a regulating tube for controlling the motor excitation to control the motor speed, and means for coupling said detector tube to the regulating tube to control the motor excitation and maintain the motor speed constant and to control the bridge circuit to stabilize the regulating operation.

9. In a regulator system, a motor having a regulating field winding, a source of current for operating said motor, means comprising a three-element thermionic tube operated according to the motor speed for controlling said field winding to maintain the motor speed constant, and means for controlling the grid of said tube from said source to compensate for any change in the voltage of the current supplied to the motor.

10. In a regulator system, a motor having a regulating field winding, a source of alternating current of limited power output having a frequency varying according to the motor speed, a Wheatstone bridge circuit having one arm thereof tuned to the frequency of said alternating current when the motor is operating at normal speed, two opposite vertices of said bridge being connected to said source of alternating current, a phase detector tube having the input circuit thereof connected to said bridge circuit, an amplifier tube governed by said detector tube for controlling the excitation of said field winding to maintain the motor speed constant, a resistance element for coupling the phase detector tube to the amplifier tube, and a condenser connected in shunt to said coupling resistance for changing the voltage conditions on the bridge circuit to prevent hunting action upon tendency of the motor to change speed.

11. In a regulator system, a motor having a regulating field winding, a source of current for operating said motor, means comprising three-element thermionic tubes operated according to the motor speed for controlling said field winding to maintain the motor speed constant, and means for controlling the grids of said tubes from said source to compensate for any change in the voltage of the current supplied to the motor.

12. In a regulator system, a motor having a regulating field winding, a three-element regulating tube for controlling said field winding, means comprising a three-element space discharge device operated according to the motor speed and coupled to said regulating tube for controlling said field winding to maintain the motor speed constant, and means for supplying potentials to the grids of said regulating tube and said device to compensate for changes in voltage of the current supplied to the motor.

13. In a regulator system, a motor having a regulating field winding, a source of current for operating said motor, a three-element regulating tube for controlling said field winding, means comprising a three-element space discharge device operated according to the motor speed and coupled to said regulating tube for controlling said field winding to maintain the motor speed constant, and means for supplying potentials of opposite sign to the grids of said regulating tube and device from said source to compensate for changes in potential impressed on the motor from said source.

14. In a motor speed regulator system, a motor having a regulating field winding, a generator operated by said motor to produce a current having a frequency varying according to the motor speed, a Wheatstone bridge circuit having one arm thereof tuned to the frequency of the generator current when the motor is operating at normal speed, means for connecting two opposite vertices of the bridge circuit to said generator, an amplifier connected to said field winding, a phase detector tube having the input circuit thereof connected to said Wheatstone bridge, the plate of said phase detector tube having alternating potential impressed thereon from the generator, a resistance element for coupling said phase detector tube to the amplifier for controlling the excitation of said field winding to maintain the motor speed constant, and a condenser connected in shunt to said coupling resistance for changing the voltage condition on the bridge circuit to prevent hunting action when the motor tends to change speed.

15. In a regulator system, a motor having a regulating field winding, a generator operated by said motor to produce an alternating current having a frequency varying according to the motor speed, a Wheatstone bridge circuit having one arm tuned to the frequency of said alternating current when the motor is operating at normal speed, an amplifier having a limited power output for connecting said generator to two opposite vertices of said bridge, a three-element phase detector tube having the input circuit thereof connected to the other two vertices of said bridge, means for impressing alternating potential on the detector plate from said amplifier, a three-element regulating tube for controlling the excitation of said field winding, a resistance element for coupling the regulating tube to the phase detector tube to control the motor field excitation and maintain the motor speed constant, and a condenser connected in shunt to said coupling resistance for drawing charging current to change the voltage conditions on said bridge and prevent hunting action when the motor tends to change speed.

16. In a regulator system, a dynamo-electric machine, a source of current having a frequency varying according to a characteristic of said machine, a frequency sensitive element, control means having a limited power output for connecting the frequency sensitive element to the source of current, means governed by the frequency sensitive element for maintaining the machine characteristic constant, and means operative upon slight change in the characteristic of said machine for varying the output with respect to the input of said control means to stabilize the regulating operation.

17. In a regulator system, a dynamo-electric machine, a frequency sensitive element, control means having a limited power output and supplying said frequency sensitive element with current having a frequency varying according to a characteristic of said machine, means governed by the frequency sensitive element to maintain said characteristic of the machine constant, and means operative upon slight change in the characteristic of said machine for varying the output with respect to the input of said control means to stabilize the regulating operation.

18. In a regulator system, a dynamo-electric machine, a source of current having a limited power output and a frequency varying according to a characteristic of said machine, means controlled by the output from said source for governing said machine to maintain the characteristic thereof constant, and means operative upon slight change in the characteristic of said machine for varying the load on said source to stabilize the regulating operation.

In witness whereof, I hereunto subscribe my name this 23rd day of April, 1929.

EDMUND R. MORTON.